US007958748B2

(12) United States Patent
Hoysan

(10) Patent No.: US 7,958,748 B2
(45) Date of Patent: Jun. 14, 2011

(54) ISOPIPE DESIGN FEATURE TO REDUCE SAG

(75) Inventor: Steven F Hoysan, Cypress, TX (US)

(73) Assignee: Corning Incorporated, Corning, NY (US)

( * ) Notice: Subject to any disclaimer, the term of this patent is extended or adjusted under 35 U.S.C. 154(b) by 764 days.

(21) Appl. No.: 12/011,547

(22) Filed: Jan. 28, 2008

(65) Prior Publication Data

US 2008/0202164 A1 Aug. 28, 2008

Related U.S. Application Data

(60) Provisional application No. 60/903,025, filed on Feb. 23, 2007.

(51) Int. Cl.
*C03B 15/02* (2006.01)
*C03B 17/00* (2006.01)
*C03B 17/06* (2006.01)
(52) U.S. Cl. ...................... 65/195; 65/53; 65/90; 65/193
(58) Field of Classification Search .............. 65/53, 195, 65/193, 90
See application file for complete search history.

(56) References Cited

U.S. PATENT DOCUMENTS

| 1,739,960 | A | | 12/1929 | Ferngren | |
|---|---|---|---|---|---|
| 1,759,229 | A | * | 5/1930 | Drake | 65/53 |
| 1,829,641 | A | * | 10/1931 | Ferngren | 65/195 |
| 1,841,579 | A | * | 1/1932 | Fraser | 65/53 |
| 3,149,949 | A | * | 9/1964 | Dockerty et al. | 65/53 |
| 3,437,470 | A | * | 4/1969 | Overman | 65/195 |
| 4,214,886 | A | * | 7/1980 | Shay et al. | 65/121 |
| 6,974,786 | B2 | | 12/2005 | Helfinstine et al. | 501/106 |
| 6,997,017 | B2 | | 2/2006 | Pitbladdo | 63/53 |
| 7,690,221 | B2 | * | 4/2010 | Pitbladdo | 65/195 |
| 2003/0192349 | A1 | | 10/2003 | Meda et al. | 63/53 |
| 2005/0130830 | A1 | | 6/2005 | Ames et al. | 501/103 |
| 2006/0016219 | A1 | * | 1/2006 | Pitbladdo | 65/29.21 |
| 2008/0202165 | A1 | * | 8/2008 | Hoysan et al. | 65/90 |

FOREIGN PATENT DOCUMENTS

JP 11246230 9/1999

OTHER PUBLICATIONS

Peter L. Bocko, Mark H. Mitchell CGR NSF Industry—University Center for Glass Research, *AMLCD Glass Substrates—Foundation for High-Tech Displays.*

* cited by examiner

*Primary Examiner* — Jason L. Lazorcik
(74) *Attorney, Agent, or Firm* — Siwen Chen

(57) ABSTRACT

Disclosed is an isopipe for use in the manufacture of sheet glass by, and more specifically to an isopipe designed to control sag during use, as well as a method for reducing the sag of an isopipe used in a fusion process for molten glass. In one embodiment, the isopipe comprises a cavity that extends at least partially through the refractory body of the isopipe along its longitudinal length. The cavity has varying cross-sections configured such that, for at least a portion of the length of the isopipe, the load bending moment is greater than or generally equal to the gravity bending moment. In one embodiment, the neutral axis varies along the length of the cavity and has a similar profile to that of the gravity bending moment diagram.

16 Claims, 3 Drawing Sheets

FIG. 1
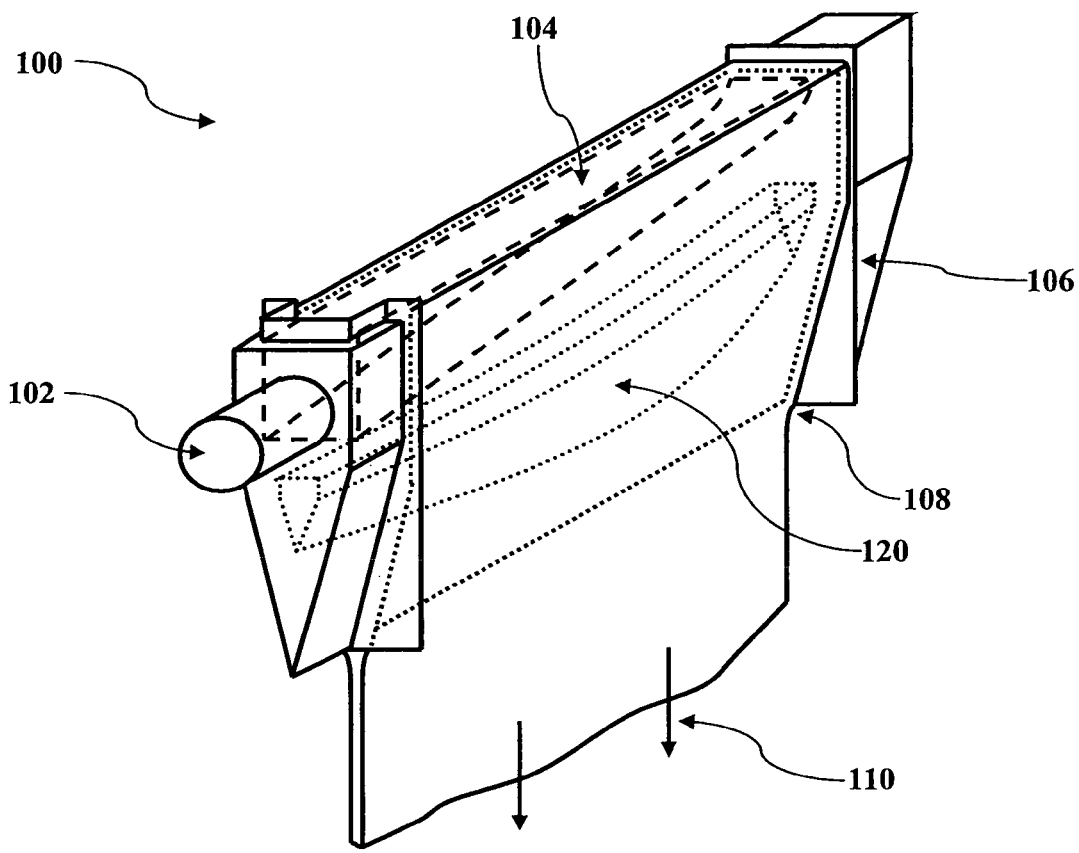
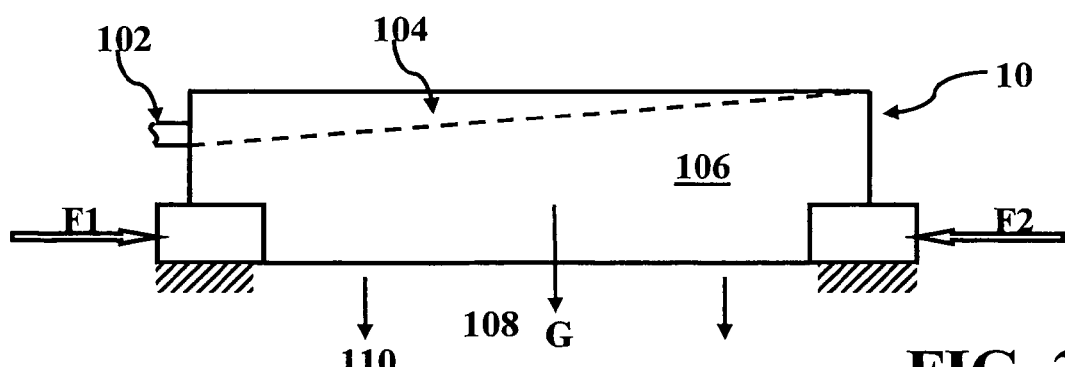
FIG. 2
(prior art)

FIG. 7
(prior art)
FIG. 8A
FIG. 8B
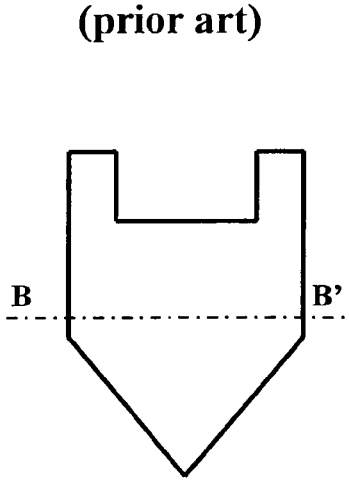
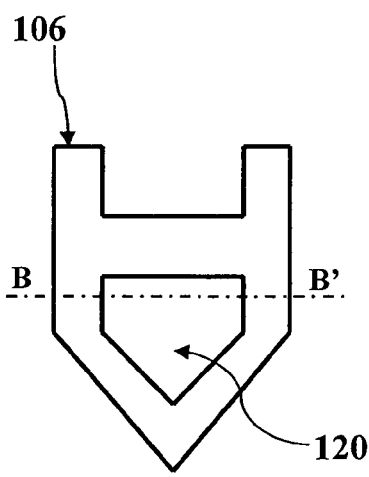
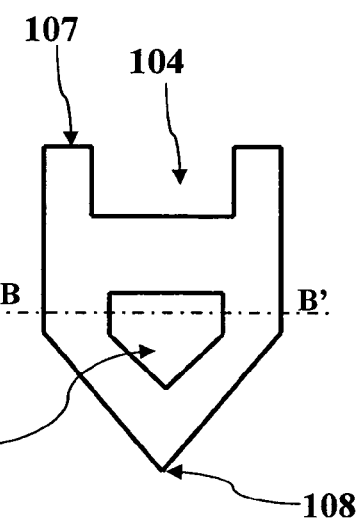
FIG. 9A
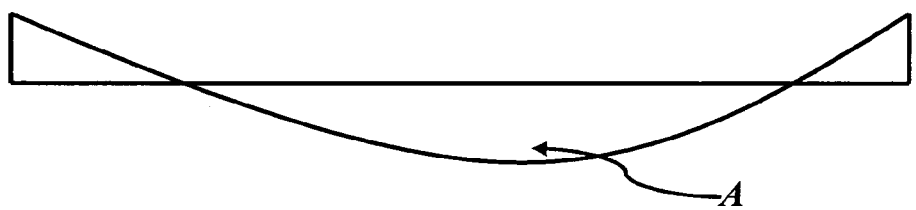
FIG. 9B

ISOPIPE DESIGN FEATURE TO REDUCE SAG

CROSS-REFERENCE TO RELATED APPLICATION

This present application claims the benefit under 35 U.S.C. §119(e) of U.S. Provisional Patent Application Ser. No. 60/903,025, filed on Feb. 23, 2007 and entitled "Isopipe Design Features to Eliminate Sag," the content of which is relied upon and incorporated by reference in its entirety.

TECHNICAL FIELD

The present invention relates to the use of devices in the manufacture of sheet glass by the fusion process, and specifically to an isopipe designed to control sag during use.

BACKGROUND

The fusion process is one of the basic techniques used to produce sheet glass and can produce sheet glass having surfaces with superior flatness and smoothness relative to sheet glass produced by alternative processes, such as for example, the float and slot drawn processes. As a result, the fusion process has found advantageous use in the production of the glass substrates used in the manufacture of light emitting displays, such as liquid crystal displays (LCDs).

The fusion process, specifically, the overflow downdraw fusion process, includes a supply pipe which provides molten glass to a collection trough formed in a refractory body known as an isopipe. During the overflow downdraw fusion process, molten glass passes from the supply pipe to the trough and then overflows the top of the trough on both sides, thus forming two sheets of glass that flow downward and then inward along the outer surfaces of the isopipe. The two sheets meet at the bottom or root of the isopipe, where they fuse together into a single sheet. The single sheet is then fed to drawing equipment that controls the thickness of the sheet by the rate at which the sheet is drawn away from the root. The drawing equipment is typically located well downstream of the root so that the single sheet has cooled and become rigid before coming into contact with the equipment.

Conventionally, the outer surfaces of the final glass sheet do not contact any part of the outside surface of the isopipe during any part of the process. Rather, these surfaces only face outwardly toward the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

The dimensional stability of an isopipe during the glass forming process can affect the overall success of the manufacturing process, as well as the properties of the manufactured glass sheet. In the overflow downdraw fusion process, an isopipe can be subjected to temperatures of about 1,000° C. While exposed to these temperatures, an isopipe must support its own weight, the weight of the molten glass contained within the isopipe and overflowing its sides, and at least some tensional force that is transferred back to the isopipe through the fused glass as it is being drawn.

Commercial and market factors require a continuous increase in the size of light emitting displays and thus, the size of sheet glass. Depending on the width of the sheet glass to be produced, an isopipe can have an unsupported length of about 1.5 meters or more.

To withstand these demanding conditions, isopipes have conventionally been manufactured from isostatically pressed blocks of refractory material (hence the name "isopipe"). In particular, isostatically pressed zircon refractories have been used to form isopipes for the fusion process. Conventional zircon refractories are composed primarily of $ZrO_2$ and $SiO_2$, or equivalently $ZrSiO_4$, and sintering additives. Even with such high performance materials, isopipe materials can creep, resulting in dimensional changes which limit their useful life. In particular, isopipes exhibit sag such that the middle of the unsupported length of the pipe drops below the height of its supported outer ends.

Thus, there is a need to address dimensional stability and other shortcomings associated with conventional isopipes and methods for manufacturing sheet glass. These needs and other needs are satisfied by the design and composition of devices of the present invention.

SUMMARY

According to a first aspect of the present invention, provided is an isopipe for use in a fusion process for molten glass in which a compressive load is applied to the isopipe, comprising:

a refractory body comprising:
  a proximal end configured for application of at least a portion of the compressive load;
  a distal end configured for application of at least a portion of the compressive load;
  an upper portion, wherein at least a portion of said upper portion defines a collection trough configured to receive the molten glass; and
  a root portion opposed to the upper portion,
  wherein the refractory body further defines a cavity positioned between the upper portion and root portion that extends longitudinally at least partially between the respective proximal and distal ends, and wherein a cross-sectional area of the cavity varies along the longitudinal length of at least a portion of the cavity.

According to certain embodiments of the first aspect of the present invention (called embodiment C2 hereinafter), the weight of the refractory body and the weight of the molten glass impart a gravity bending moment on the refractory body, wherein the compressive load applied to the respective proximal and distal ends of the refractory body imparts a load bending moment on the refractory body, and wherein the cross-sectional shape of the at least a portion of the cavity is configured such that, for at least a center portion of the longitudinal length of the refractory body, the load bending moment is greater than or generally equal to the gravity bending moment. In certain specific embodiments of embodiment C2, the cross-sectional shape of the at least a portion of the cavity is configured such that the load bending moment is greater than or generally equal to the gravity bending moment across the longitudinal length of the refractory body. In certain specific embodiments of C2, a cross-section of the refractory body has a neutral axis that is substantially normal to a longitudinal axis of the refractory body, and wherein the load bending moment applied to any cross-section of the at least a portion of the cavity is substantially equal to the compressive load multiplied by the distance from the neutral axis to an action line of the compressive load.

According to certain embodiments of the first aspect of the present invention, the cavity extends between the proximal and distal ends of the refractory body.

According to certain embodiments of the first aspect of the present invention (called embodiment C6 hereinafter, which may or may not be an embodiment mentioned above), a cross-sectional shape of the cavity varies along the longitudinal length of at least a portion of the cavity. In certain specific embodiments of embodiment C6, at least a portion of the cross-sectional shape of the cavity of a respective cross-section has a similar shape to at least a portion of the exterior shape of the refractory body of the cross-section. In certain specific embodiments of embodiment C6, at least a portion of the cross-sectional shape of the cavity of a respective cross-section differs from at least a portion of the exterior shape of the refractory body of the cross-section.

In certain specific embodiment of embodiment C2 (called embodiment C9 hereinafter), the cavity has a lower surface, wherein at least a portion of the lower surface has a curved shape, and wherein a center portion of the lower surface is spaced downwardly away from the longitudinal axis of the refractory body relative to the respective ends of the cavity.

In certain specific embodiments of embodiment C9, the cavity has an upper surface, wherein at least a portion of the upper surface has a curved shape, and wherein, for a cross-section of the refractory body, the relative curvature of the curved portion of the upper surface is less than the curvature of the curved portion of the lower surface.

According to certain embodiments of the first aspect of the present invention (called embodiment C11 hereinafter), the refractory body comprises a zircon refractory material. In certain specific embodiments of embodiment C11, the zircon refractory material further comprises at least one of $TiO_2$, $ZrSiO_4$, $ZrO_2$, and $Fe_2O_3$.

A second aspect of the present invention is an isopipe for use in a fusion process for molten glass in which a compressive load is applied to the isopipe, comprising:
 a refractory body comprising:
  a proximal end configured for application of at least a portion of the compressive load;
  a distal end configured for application of at least a portion of the compressive load;
  an upper portion, wherein at least a portion of said upper portion defines a collection trough configured to receive the molten glass; and
  a root portion opposed to the upper portion,
 wherein the refractory body further defines a cavity positioned between the upper portion and root portion that extends longitudinally at least partially between the respective proximal and distal ends, and wherein a cross-sectional shape of the cavity varies along the longitudinal length of at least a portion of the cavity.

A third aspect of the present invention is a method for reducing the sag of an isopipe used in a fusion process for molten glass that produces glass sheets, comprising:
 a) providing a refractory body comprising:
  a proximal end;
  a distal end;
  an upper portion, wherein at least a portion of said upper portion defines a collection trough configured to receive the molten glass; and
  a root portion opposed to the upper portion,
 wherein the refractory body further defines a cavity positioned between the upper portion and root portion that extends longitudinally at least partially between the respective proximal and distal ends, and wherein a cross-sectional area of the cavity varies along the longitudinal length of at least a portion of the cavity; and
 b) applying a compressive load to portions of the respective proximal and distal ends of the refractory body.

According to certain embodiments of the third aspect of the present invention (called embodiment C15 hereinafter), the weight of the refractory body and the weight of the molten glass impart a gravity bending moment on the refractory body, wherein the compressive load applied to the respective proximal and distal ends of the refractory body imparts a load bending moment on the refractory body, and wherein the cross-sectional area of the at least a portion of the cavity is configured such that, for at least a center portion of the longitudinal length of the refractory body, the load bending moment is greater than or generally equal to the gravity bending moment.

In certain specific embodiments of embodiment C15, the cross-sectional area of the at least a portion of the cavity is configured such that the load bending moment is greater than or generally equal to the gravity bending moment across the longitudinal length of the refractory body.

In certain specific embodiments of embodiment C15, a cross-section of the refractory body has a neutral axis that is substantially normal to a longitudinal axis of the refractory body, and wherein the load bending moment applied to any cross-section of the at least a portion of the cavity is substantially equal to the compressive load multiplied by the distance from the neutral axis to an action line of the compressive load.

According to certain embodiments of the third aspect of the present invention, the cavity extends between the proximal and distal ends of the refractory body.

According to certain embodiments of the third aspect of the present invention (called embodiment C19 hereinafter), the refractory body comprises a zircon refractory material.

In certain specific embodiments of embodiment C19, the zircon refractory material further comprises at least one of $TiO_2$, $ZrSiO_4$, $ZrO_2$, and $Fe_2O_3$.

According to certain embodiments of the third aspect of the present invention, a cross-sectional shape of the cavity varies along the longitudinal length of at least a portion of the cavity.

A fourth aspect of the present invention is a method for reducing the sag of an isopipe used in a fusion process for molten glass that produces glass sheets, comprising:
 a) providing a refractory body comprising:
  a proximal end;
  a distal end;
  an upper portion, wherein at least a portion of said upper portion defines a collection trough configured to receive the molten glass; and
  a root portion opposed to the upper portion,
 wherein the refractory body further defines a cavity positioned between the upper portion and root portion that extends longitudinally at least partially between the respective proximal and distal ends, and wherein a cross-sectional shape of the cavity varies along the longitudinal length of at least a portion of the cavity; and
 b) applying a compressive load to portions of the respective proximal and distal ends of the refractory body along an action line.

Additional embodiments of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed and/or as claimed.

BRIEF DESCRIPTION OF THE DRAWINGS

The accompanying drawings, which are incorporated in and constitute a part of this specification, illustrate certain aspects of the present invention and, together with the description, serve to explain, without limitation, the principles of the invention. Like numbers represent the same elements throughout the figures.

FIG. 1 is a schematic diagram illustrating an isopipe for use in an overflow downdraw fusion process for making sheet glass, in accordance with one embodiment of the present invention.

FIG. 2 is a schematic diagram illustrating a side-view of a conventional isopipe showing exemplary forces acting on the isopipe. In this figure, G stands for gravity, and F1 and F2 stand for compression load.

FIG. 7 is a schematic diagram illustrating a cross-sectional view and respective neutral axis (BB') of a conventional isopipe, for example one as shown in FIG. 2.

FIG. 8A is a schematic diagram illustrating a cross-sectional view taken across line 8A-8A of FIG. 5, and showing the neutral axis (BB') of the section of the isopipe, in accordance with one embodiment of the present invention.

FIG. 8B is a schematic diagram illustrating a cross-sectional view taken across line 8B-8B of FIG. 5, and showing the neutral axis (BB') of the section of the isopipe, in accordance with one embodiment of the present invention.

FIG. 9A is a graphical illustration of a moment diagram for a conventional isopipe, for example as shown in FIG. 2, in accordance with one embodiment of the present invention.

FIG. 9B is a graphical illustration of a moment diagram for an isopipe having an internal cavity, for example as shown in FIGS. 1 and 5, in accordance with one embodiment of the present invention.

DETAILED DESCRIPTION

Figure 3:
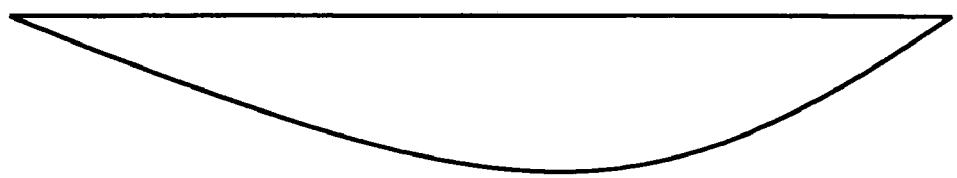
FIG. 3 is a graphical illustration of a moment diagram for the gravity load on the conventional isopipe of FIG. 2.

The following description of the invention is provided as an enabling teaching of the invention in its best, currently known embodiment. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "cavity" includes embodiments having two or more such "cavities" unless the context clearly indicates otherwise.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The following U.S. patents and pending applications describe various compositions and methods for manufacturing sheet glass, and they are hereby incorporated by reference in their entirety and for the specific purpose of disclosing materials and methods relating to the formation of refractory ceramics and isopipes: U.S. Pat. No. 6,974,786, and U.S. Publication No. 2005/0130830.

As briefly summarized above, the present invention provides an isopipe for use in the manufacture of sheet glass by, and more specifically to an isopipe designed to control sag during use. With reference to the drawings, FIG. 1 illustrates a schematic of an embodiment of the isopipe 100 of the present invention which is configured for use in the manufacture of sheet glass by, for example, the overflow downdraw fusion process.

Referring to FIG. 2, a conventional isopipe 10 and sheet glass manufacturing system comprises a supply pipe 102 that provides molten glass to a collection trough 104 formed in a refractory body 106 of the isopipe. During operation, molten glass can flow from the supply pipe to the trough where it can overflow the top of the trough on both sides, forming two sheets of glass that flow downward and then inward along the outer surfaces of the isopipe. The two sheets meet at the bottom, or root 108 of the isopipe where they can fuse together into a single sheet. The single sheet is then fed to drawing equipment (represented by arrows 110).

In the overflow downdraw fusion process, the isopipe used to control the flow of molten glass is critical. The isopipe is at the same, often very high, temperature as the molten glass. At this temperature, the isopipe material is subject to creep straining, and thus begins to deform at a very slow rate. The gravity loading imposed on the isopipe, which includes, for example, the weight of the isopipe itself as well as the weight of the molten glass, causes the isopipe to sag. Since the isopipe behaves like a simply supported beam, the sag of the isopipe is directly related to the bending of the isopipe. As may be appreciated, the sagging affects the flow characteristics of the glass and thus the quality of the final product. A compressive load is often applied to the respective ends of the isopipe to counteract the effects of the gravity loading.

Figure 4:
FIG. 4 is a graphical illustration of a moment diagram for the compressive load on the conventional isopipe of FIG. 2.

However, in conventional isopipes, the compressive load cannot sufficiently counteract the gravity loading to prevent sag of the isopipe. FIG. 2 is a graphical illustration of a side-view of a conventional isopipe 10 that illustrates the gravity load and compressive loads acting on the isopipe. FIG. 3 illustrates an exemplary gravity moment diagram for the gravity loading on the conventional isopipe. As is known in the art, the moment at any point along the isopipe is simply equal to the force multiplied by the distance from the point to the action line of the force. As may be appreciated, if the isopipe had a constant cross-section, the gravity moment diagram would be generally parabolic in shape. In conventional isopipes the trough is typically angled between the respective ends of the isopipe, which results in a variation in the cross-section of the isopipe. Due to this, there is a slight deviation from a generally parabolic shape, as is shown in FIG. 3. FIG. 4 illustrates an exemplary load bending moment diagram for the conventional isopipe, based on the compressive loads applied at the respective ends of the isopipe. As may be appreciated, if the cross-section of the isopipe were constant, the moment diagram would have a constant value along the length of the isopipe.

The resultant moment diagram (including, for example, the gravity moment and load bending moment) for the conventional isopipe is shown in FIG. 9A. As described above, the bending moment for gravity loading is generally parabolic in shape, and the bending moment for the compressive load is relatively constant along the length; both of the bending moments deviate slightly due to the angle of the collection trough. Conventional beam theory provides that the second derivative of deflection is proportional to the bending moment along the beam, the inference being that deflection is related to the area under the bending moment diagram. Thus, in a conventional isopipe, the compressive load can reduce the area under the moment diagram, represented as "A" in FIG. 9A, but can never eliminate it. Therefore, a conventional isopipe will always sag.

As discussed above with reference to FIGS. 1 and 5, an isopipe 100 comprises a refractory body 106, an upper portion 107, a portion of which defines a collection trough 104 configured to receive molten glass, and a root portion 108 opposed to the upper portion. The isopipe 100 also comprises respective ends, such as a proximal end 110 and a distal end 112, which are configured to allow for the application of compressive loads along an action line, which is exemplarily shown by the "compressive load" arrows in FIG. 5.

In accordance with one embodiment of the present invention, the isopipe 100 comprised a cavity 120 defined therein the refractory body 106. In one example, the cavity is positioned between the upper portion and root portion of the isopipe that extends along the length of the isopipe, at least partially between the proximal and distal ends. Optionally, in one embodiment, the cavity 120 extends between the proximal and distal ends of the refractory body. In one embodiment, such as shown in the exemplary isopipe of FIG. 5, the area of the cavity 120 varies along the length of the isopipe; thus, the cross-sectional area of the cavity also varies along the length of the isopipe. In some embodiments, the cross-sectional area of the cavity varies along the entire length of the isopipe. Optionally, the cross-sectional area of the cavity varies along only a portion of the cavity. In another embodiment, the shape of the cavity 120 varies along the length of the isopipe. In this example, the cross-sectional shape of the cavity also varies along the length of the isopipe. In some embodiments, the cross-sectional shape of the cavity varies along the entire length of the isopipe. Optionally, the cross-sectional shape of the cavity varies along only a portion of the cavity.

As discussed above, the weight of the isopipe (such as the refractory body) and the weight of the molten glass impart a gravity bending moment on the refractory body. Similarly, the compressive load applied to the respective proximal and distal ends of the refractive body imparts a load bending moment on the refractory body. According to one embodiment, the cross-sectional shape of at least a portion of the cavity 120 is configured such that the bending moment is greater than or generally equal to the gravity bending moment across the longitudinal length of the refractory body. Optionally, in one embodiment, the cross-sectional shape of at least a portion of the cavity 120 is configured such that the bending moment is greater than or generally equal to the gravity bending moment for at least a center portion of the refractory body, taken along the longitudinal length of the refractory body.

FIG. 7 illustrates an exemplary cross-section of a conventional isopipe, such as the conventional isopipe 10 illustrated in FIG. 2. Similarly, FIGS. 8A and 8B illustrate exemplary cross-sections of the isopipe 100 of the present invention having a cavity 120 according to various embodiments, as exemplarily shown in FIGS. 1 and 5. As may be appreciated, at any and all cross-sections taken along the longitudinal length of the isopipe, there is a point of zero strain that defines a neutral axis. As the figures illustrate, and as one skilled in the art will appreciate, the neutral axis varies depending on the cross-sectional shape of the isopipe. In one embodiment, the load bending moment applied to any cross-section of the isopipe (or a portion thereof, such as the cavity), is substantially equal to the compressive load multiplied by the distance from the respective neutral axis to the action line of the compressive load. FIG. 6 illustrates the effect of a cavity 120 having varying cross-sections on the load bending moment diagram of the isopipe (for example, in comparison to the load bending moment diagram of FIG. 4). FIG. 9B illustrates the moment diagram for a cavity having varying cross-sections (i.e., the combination of the load bending and gravity moment diagrams).

As can be seen, the design of the isopipe 100 of the present invention substantially eliminates the area under the moment diagram, such as area "A" in FIG. 9A. In various embodiments, this is achieved by shaping the cavity 120 so that the neutral axis varies along the longitudinal length of the refractory body with a similar profile as that of the gravity bending moment diagram of the gravity loading. In some embodiments, the profile of the neutral axis is substantially the same as the profile of the gravity bending moment diagram of the gravity loading. As may be appreciated, as the shape of the cavity 120 changes, the weight of the isopipe itself changes, thus affecting the profile of the gravity bending moment diagram. Thus, in various embodiments, an iterative process is performed to achieve a cavity having a similar or substantially same profile as the profile of the gravity bending moment diagram.

As illustrated in FIGS. 8A and 8B, in various embodiments, the cross-section of the cavity 120 of an isopipe 100 has a similar shape to at least a portion of the exterior shape of the refractory body of the cross-section. Optionally, the cross-section of the cavity can be of any other shape that does not necessarily correspond in shape to the exterior shape of the refractory body. In various embodiments, the cross-section of the cavity changes across the longitudinal length of the refractory body. FIGS. 8A and 8B illustrate exemplary cross-sections taken at sections '8A-8A' and '8B-8B' of FIG. 5, respectively. As can be seen, the shapes of both cross-sections are similar, but the dimensions differ. Optionally, in some embodiments, both the shape and dimensions of the cavity 120 may vary along the length of the refractory body.

Figure 5:
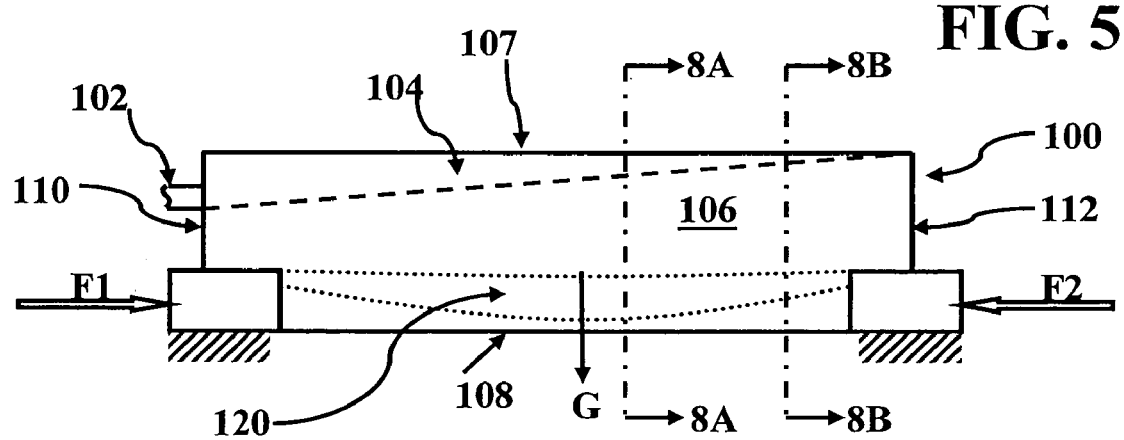
FIG. 5 is a schematic diagram illustrating a side-view of an isopipe of the present invention, showing an internal cavity and exemplary forces acting on the isopipe. In this figure, F1 and F2 are compression loads; G stands for gravity.
Figure 6:
FIG. 6 is a graphical illustration of a moment diagram for the compressive load on the isopipe of FIG. 5, in accordance with one embodiment of the present invention.

As can be seen in FIG. 5, in one embodiment the cavity 120 has an upper surface and lower surface along the longitudinal length of the cavity, represented by the curved dashed lines in the figure. In various embodiments, the lower surface has a curved shape, of which a center portion is spaced downwardly from a longitudinal axis of the refractory body relative to the respective ends of the cavity. In other embodiments, the upper surface likewise has a curved shape, of which a center portion is spaced downwardly from a different longitudinal axis of the refractory body. Optionally, in one embodiment, the upper surface may be substantially parallel to a longitudinal axis of the refractory body and the lower surface may be curved as described above. In another embodiment, the upper surface may be curved as described above, and the lower surface may be substantially parallel to a longitudinal axis of the refractory body. In other embodiments, the upper and lower surfaces can have other configurations, or a combination of curved and straight portions and other configurations. As shown in FIG. 5, in one embodiment, both the upper and lower surfaces may have a curved portion in which the relative curvature of the curved portion of the upper surface is less than the curvature of the curved portion of the lower surface.

The present invention also provides methods for reducing the sag of an isopipe 100 used in a fusion process for molten glass. In one embodiment, a method is provided that comprises providing a refractory body 106 that defines a cavity therein and applying a compressive load to respective ends of the refractory body. In one embodiment, the refractory body comprises a proximal end 110, a distal end 112, an upper portion 107 (a portion of which defines a collection trough 104 configured to receive the molten glass), and a root portion 108 opposed to the upper portion. The cavity 120 is positioned between the upper portion and root portion and extends longitudinally at least partially between the respective proximal and distal ends. Thus, in some embodiments, the cavity 120 extends only partially between the respective ends; optionally, the cavity extends between the proximal and distal ends. The cross-sectional shape of the cavity 120 varies along the longitudinal length of at least a portion of the cavity, such as, but not limited to, the description above.

As described above, the weight of the refractory body and the weight of the molten glass impart a gravity bending moment on the refractory body, and the compressive load applied to the respective ends imparts a load bending moment on the refractory body. In one embodiment, a refractory body is provided that has a cavity, in which a cross-sectional shape of at least a portion of the cavity is configured such that, for at least a portion of the longitudinal length of the refractory body, the road bending moment is greater than or generally equal to the gravity bending moment. In one embodiment, the portion is a center portion of the refractory body. In other embodiments, the cross-sectional shape of the cavity is configured such that the load bending moment is greater than or generally equal to the gravity bending moment across the longitudinal length of the refractory body.

As described above, each cross-section of the refractory body defines a neutral axis, which is normal to the longitudinal axis of the refractory body. In one embodiment, the load bending moment applied to any cross-section of at least a portion of the cavity is substantially equal to the compressive load multiplied by the distance from the neutral axis to the action line of the compressive load.

In one embodiment of the present invention, the refractory body of the isopipe comprises a zircon refractory material. In a further embodiment, the zircon refractory material comprises at least one of $TiO_2$, $ZrSiO_4$, $ZrO_2$, and $Fe_2O_3$. In one embodiment, the zircon refractory material has a $TiO_2$ content greater than about 0.2 wt. % and less than about 0.4 wt. %, such as, for example, about 0.3 wt. %. The presence of $TiO_2$ can result in an isopipe having reduced sag as a result of the refractory having a lower mean creep rate than zircon refractories currently used in the art. For example, the zircon refractory can have a mean creep rate at 1180° C. and 250 psi that is substantially less than 0.5×10−6 inches/inches/hour. In addition, such a $TiO_2$ content also causes the refractory material to have a 95% confidence band (CB) for the mean creep rate (MCR) which is less than 50% of the mean creep rate, i.e., CB/MCR<0.5. Such a confidence band reduces the chances that the zircon refractory of a particular isopipe will have an abnormally high creep rate and thus cause the isopipe to have a short lifetime as a result of exhibiting unacceptable sag prematurely.

In other embodiments, the refractory material has a composition with at least the following: $TiO_2$ (0.23-0.50 wt. %), $ZrSiO_4$ (98.75-99.68 wt. %), $ZrO_2$ (0.01-0.15 wt. %), and $Fe_2O_3$ (0.08-0.60 wt. %). Additives, such as binders and dispersants, can optionally be added to the composition. For example, a binder added at about 2.00 wt. % to about 4.00 wt. % can aid in the spray drying process, improve granule strength, and improve the green strength of a pressed zircon refractory body. Similarly, a dispersant added at about 0.06 wt. % to about 0.25 wt. % can aid in wetting the components of the composition to produce a fluid mix used to make the zircon refractory material. The binder and dispersant can be combusted or volatilized when the components and, in particular, the pressed zircon refractory body is subjected to a sintering process to form the creep resistant zircon refractory material. In one embodiment, the binder is polyethylene glycol, such as Carbowax® PEG 8000 (Dow Chemical Company, Midland, Mich., USA), and a polyelectrolyte dispersant, such as an aqueous ammonium polymethacrylate (e.g., Darvan C, RT Vanderbilt Company, Inc., Norwalk, Conn., USA) are added to the mix of refractory components.

As can be seen above, zircon typically comprises greater than about 98.75% of the refractory material. Titanium dioxide ($TiO_2$) is a mineralizer or densification additive that can be used to increase the density and strength of the zircon refractory material. Iron oxide ($Fe_2O_3$) is also a mineralizer that can be added to increase the density and strength of the zircon refractory material. The optional binder and/or dispersant, are typically organic materials that can aid in the processing of the zircon refractory raw materials and are substantially or completely combusted and/or volatilized during the sintering process. During the sintering process, grain growth and bonding occur to form a continuously bonded zircon refractory material. The degree of densification and bonding determines the strength and the resistance to creep of the zircon refractory material that can be used to form, for example, an isopipe.

In one embodiment, a zircon raw-material component can comprise a multi-modal, particle size distribution, for example, a binary, a ternary, or higher order particle size distribution. In a specific embodiment, the composition of the present invention comprises a binary particle size distribution comprising greater than about 40 parts by weight of a coarse zircon component having a median particle size of from greater than 3 μm to about 25 μm, and less than about 60 parts by weight of a fine zircon component having a median particle size of 3 μm or less.

In another embodiment, the refractory composition, prior to firing and/or sintering, can comprise a zircon material and a zircon precursor. The zircon precursor can be prepared, for example, in-situ, and can form zircon particles after firing. A zircon precursor can fill in pores in the structure of a refractory ceramic body, cover a portion of the grain boundaries that form pores, and can also act as a bonding agent between grains of the pre-formed zircon. This bonding agent effect can allow a reduction or elimination in the amount of additives, such as for example, $TiO_2$, $Fe_2O_3$, glass compounds, or a combination thereof, necessary to prepare and form a zircon refractory body. The zircon precursor, if present, can comprise at least one zirconium containing compound, such as, for example, a zirconium hydrate, and at least one silicon containing compound, such as, for example, tetraethoxysilane.

Lastly, it should be understood that while the present invention has been described in detail with respect to certain illustrative and specific embodiments thereof, it should not be considered limited to such, as numerous modifications are possible without departing from the broad spirit and scope of the present invention as defined in the appended claims.

The invention claimed is:

1. An isopipe for use in a fusion process for the manufacture of sheet glass from molten glass in which a compressive load is applied to the isopipe, comprising:
a refractory body comprising:
a proximal end configured for application of at least a portion of the compressive load;
a distal end configured for application of at least a portion of the compressive load,
an upper portion, wherein at least a portion of said upper portion defines a collection trough configured to receive the molten glass,
a root portion opposed to the upper portion, and
outer surfaces which extend between the upper portion and the root portion, wherein said outer surfaces are angled inward to intersect at said root portion
wherein the refractory body further defines a cavity positioned between the upper portion, the root portion, and the outer surfaces that extends along a longitudinal axis between the respective proximal and distal ends, and wherein a cross-sectional area of the cavity varies along the longitudinal length of at least a portion of the cavity,
wherein the cavity has a lower surface, wherein at least a portion of the lower surface has a curved shape in the plane of the longitudinal axis, and wherein a center portion of the lower surface is spaced downwardly away from the longitudinal axis of the refractory body relative to the respective ends of the cavity.

2. The isopipe of claim 1, wherein a cross-section of the refractory body has a neutral axis that is substantially normal to a longitudinal axis of the refractory body, and wherein the load bending moment applied to any cross-section of the at least a portion of the cavity is substantially equal to the compressive load multiplied by the distance from the neutral axis to an action line of the compressive load.

3. The isopipe of claim 1, wherein the cavity extends between the proximal and distal ends of the refractory body.

4. The isopipe of claim 1, wherein a cross-sectional shape of the cavity varies along the longitudinal length of at least a portion of the cavity.

5. The isopipe of claim 4, wherein at least a portion of the cross-sectional shape of the cavity of a respective cross-section has a similar shape to at least a portion of the exterior shape of the refractory body of the cross-section.

6. The isopipe of claim 4, wherein at least a portion of the cross-sectional shape of the cavity of a respective cross-section differs from at least a portion of the exterior shape of the refractory body of the cross-section.

7. The isopipe of claim 1, wherein the cavity has an upper surface, wherein at least a portion of the upper surface has a curved shape, and wherein, for a cross-section of the refractory body, the relative curvature of the curved portion of the upper surface is less than the curvature of the curved portion of the lower surface.

8. The isopipe of claim 1, wherein the refractory body comprises a zircon refractory material.

9. The isopipe of claim 8, wherein the zircon refractory material further comprises at least one of $TiO_2$, $ZrSiO_4$, $ZrO_2$, and $Fe_2O_3$.

10. A method for reducing the sag of an isopipe used in a fusion process for molten glass that produces glass sheets in which a compressive load is applied to the isopipe, comprising:
a) providing a refractory body comprising:
a proximal end configured for application of at least a portion of the compressive load;
a distal end configured for application of at least a portion of the compressive load;
an upper portion, wherein at least a portion of said upper portion defines a collection trough configured to receive the molten glass,
a root portion opposed to the upper portion, and
outer surfaces which extend between the upper portion and the root portion, wherein said outer surfaces are angled inward to converge at said root portion
wherein the refractory body further defines a cavity positioned between the upper portion, the root portion, and the outer surfaces that extends along a longitudinal axis between the respective proximal and distal ends, and wherein a cross-sectional area of the cavity varies along the longitudinal length of at least a portion of the cavity; and
wherein the weight of the refractory body and the weight of the molten glass impart a gravity bending moment on the refractory body, wherein the compressive load applied to the respective proximal and distal ends of the refractory body imparts a load bending moment on the refractory body, and wherein the cross-sectional area of the at least a portion of the cavity is configured such that, for at least a center portion of the longitudinal length of the refractory body, the load bending moment is greater than or generally equal to the gravity bending moment.

11. The method of claim 10, wherein the cross-sectional area of the at least a portion of the cavity is configured such that the load bending moment is greater than or generally equal to the gravity bending moment across the longitudinal length of the refractory body.

12. The method of claim 10, wherein a cross-section of the refractory body has a neutral axis that is substantially normal to a longitudinal axis of the refractory body, and wherein the load bending moment applied to any cross-section of the at least a portion of the cavity is substantially equal to the compressive load multiplied by the distance from the neutral axis to an action line of the compressive load.

13. The method of claim 10, wherein the cavity extends between the proximal and distal ends of the refractory body.

14. The method of claim 10, wherein the refractory body comprises a zircon refractory material.

15. The method of claim 14, wherein the zircon refractory material further comprises at least one of $TiO_2$, $ZrSiO_4$, $ZrO_2$, and $Fe_2O_3$.

16. The method of claim 10, wherein a cross-sectional shape of the cavity varies along the longitudinal length of at least a portion of the cavity.

* * * * *